Aug. 10, 1926.

W. C. ANDERSON 1,595,811

PROCESS FOR MAKING ARTICLES OF MATERIALS WHICH SOLIDIFY UNDER PRESSURE AND HEAT

Filed Jan. 29, 1923    2 Sheets-Sheet 1

INVENTOR.
Walter C. Anderson
BY E. C. Brandenburg
his ATTORNEY

Aug. 10, 1926. 1,595,811
W. C. ANDERSON
PROCESS FOR MAKING ARTICLES OF MATERIALS WHICH SOLIDIFY UNDER
PRESSURE AND HEAT
Filed Jan. 29, 1923  2 Sheets-Sheet 2

INVENTOR.
Walter C. Anderson
BY E. C. Blandenburg
his ATTORNEY

Patented Aug. 10, 1926.

1,595,811

UNITED STATES PATENT OFFICE.

WALTER C. ANDERSON, OF NEWARK, DELAWARE, ASSIGNOR TO THE CONTINENTAL FIBRE COMPANY, OF NEWARK, DELAWARE, A CORPORATION OF DELAWARE.

PROCESS FOR MAKING ARTICLES OF MATERIALS WHICH SOLIDIFY UNDER PRESSURE AND HEAT.

Application filed January 29, 1923. Serial No. 615,742.

My invention relates to a process for making articles of materials which solidify under pressure and heat. At the present time, paper or other fibrous material, coated or saturated with a phenolic condensation product, such as bakelite, is wrapped continuously around a heated mandrel under heated rolls; and afterwards, in order to complete the reaction in the bakelite or other binder the tubes are placed in an oven and heated to a high temperature for a period of time, and sometimes under air pressure; but it is well understood that air pressure cannot be economically produced over two hundred pounds per square inch.

Another process in common use at the present time in the production of such tubes, after the wrapping, is to place the tubes in a split mold, and then apply heat and pressure. Tubes made by this molded process are satisfactory except for the defect of having a mold mark or seam on two sides of the tube, which is a source of weakness.

My invention relates to a process for making useful articles of materials which have the property of solidifying or hardening when pressure and heat are applied to them, and apparatus for carrying out this process. Some of the available materials are composite materials consisting of a fibrous material as a base and a binding material having the property above referred to. Such materials may be either in sheet or plastic form. In my process, I first apply the material to a rigid support, the purpose of the support being to hold the material in the desired shape, and immerse the material with its support in a liquid which is contained in a strong vessel. I then seal the vessel and apply pressure to said liquid and heat the vessel and its contents to the temperature required to solidify the material, or the binder when the material is composite. The pressure and heat are transmitted to the material by the liquid. I maintain the pressure and heat for a period of time necessary to properly solidify the material and, after releasing the pressure and opening the vessel, I remove the material, which is now the desired article, from the vessel. The article may be left on its support or removed as desired, and any liquid which adheres to the surface of the article may be wiped off. In some cases I find it desirable to cool the vessel and its contents before releasing the pressure.

The liquid used in my process may be any substance which is a liquid under the conditions of pressure and temperature required by the process, which will be safe to use and which will not interfere with the solidification of the material.

One form of my present process consists of tightly wrapping on a metallic mandrel heated to approximately 250° F., the paper or fibrous material which has been coated or saturated throughout with a phenolic condensation product, such as bakelite. The fibrous material is heated as it is wrapped to a temperature of 250° to 300° F., which heat combined with the heat of the mandrel causes the several layers to stick together, but without changing the binder to its final infusible and insoluble form. The wrapping is continued until the desired wall thickness is obtained, allowing additional material for subsequent shrinkage. One or several mandrels may be wrapped in this manner and placed in a strong cylinder receptacle which is provided with a source of heat such as a steam jacket. After the tubes have been put into the receptacle, it is then filled with melted grease.

At least one thousand pounds per square inch is required to compress the tubes properly, and this pressure can only be transmitted satisfactorily to the surface of the tubes by means of a liquid, liquid being incompressible. Another advantage is, the heat is conducted to the tube more rapidly through a liquid than through air.

After the cylinder containing the tubes has been filled with this liquid and pressure of one thousand pounds per square inch is applied to the grease by means of a pump or other means, the cylinder and contents are then heated to about 320° F., the source of heat being the steam which is turned into the steam jacket at about one hundred pounds per square inch pressure. Heat and pressure transmitted by the grease or liquid to the wrappings on the mandrel changes these wrappings to a solid tube on account of the chemical reaction in the binder and the application of heat and pressure at the same time.

The time required to complete this reaction is at least fifteen minutes after the temperature has reached 300° F. The pressure is then released and the tubes removed while hot, but if there is any water in the cylinder it will flash into steam. It is, therefore, better to hold the pressure and blow the steam out of the jacket. Water is then circulated through the jacket until the temperature of the grease or liquid falls below 212° F. but not low enough to cause the grease to harden.

The pressure is then released and the mandrels with the tubes on them lifted out and allowed to drain. The excess grease is wiped off and the finished tubes pushed off the mandrels.

While the present invention is essentially a method or process, and might be carried out successfully in different ways, and by different apparatus, nevertheless a suitable mechanism for successfully carrying out the method or process is set forth in the following description, and illustrated in the accompanying drawings, in which:—

Figure 1:
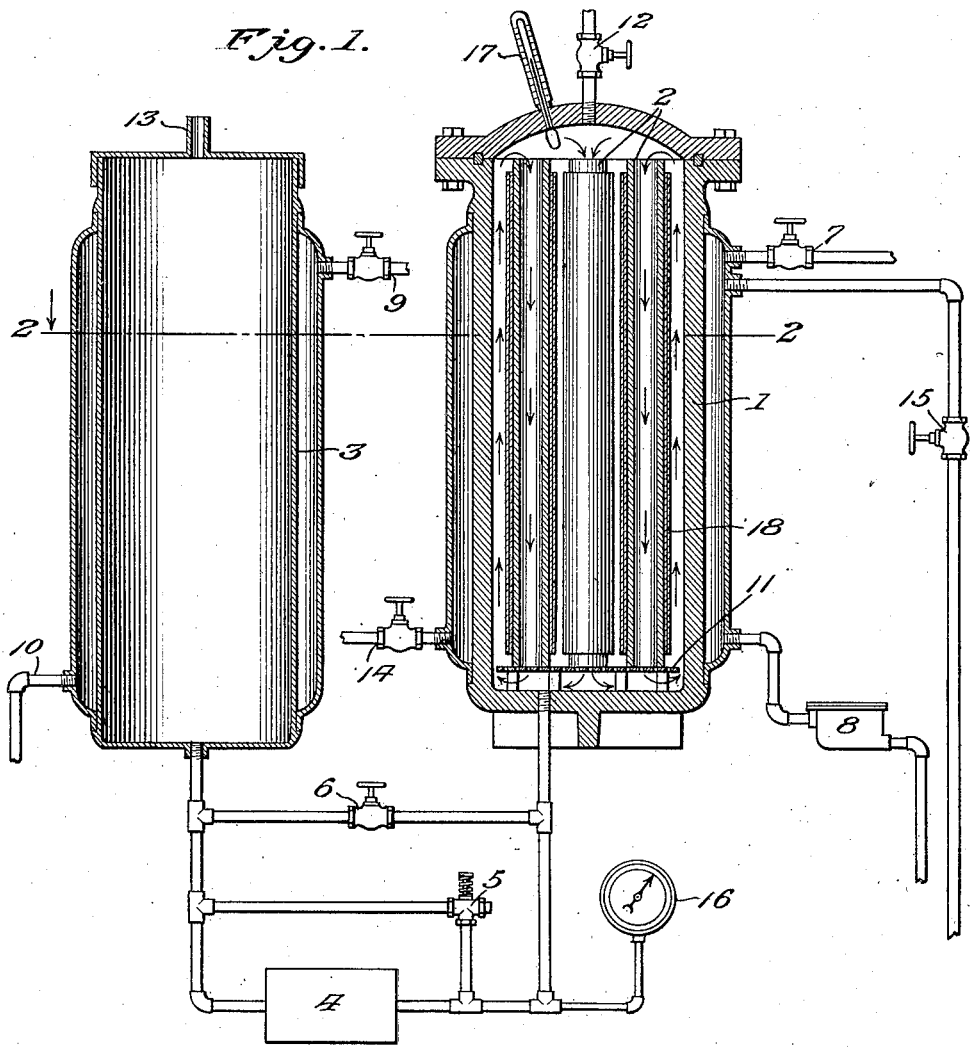
Fig. 1 shows a general arrangement of apparatus in vertical section, but spread out for clearness.

The apparatus which I use to carry out this process is substantially as described below and as shown in the drawings.

I will now describe in detail how my process and apparatus is used for making seamless, laminated tubes of composite material, it being understood that such tubes are only one class of articles which can be made by my process and in my apparatus.

Figure 2:
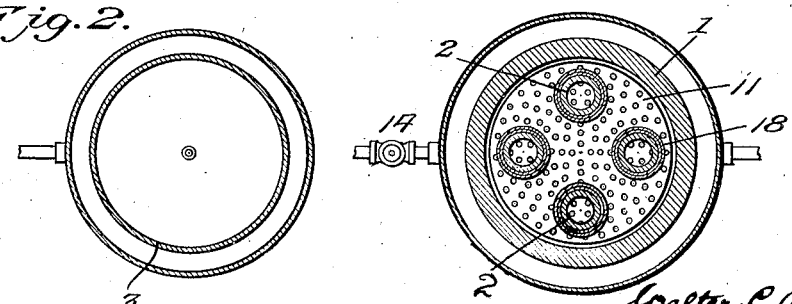
Fig. 2 is a section on line 2—2 of Fig. 1.
Figure 3:
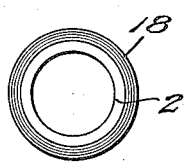
Figs. 3 and 4 are top plan and side elevation respectively of a mandrel with material wrapped around it.
Figure 5:
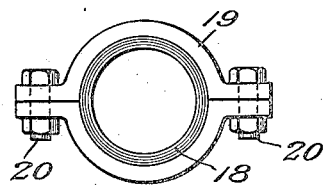
Figs. 5 and 6 show a plan and side elevation, partly in section, of a split external support for a tube held together by bolts.
Figure 7:
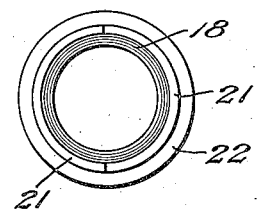
Figs. 7 and 8 show another form of split external support tapered from the center toward the ends and held together by rings.
Figure 4:
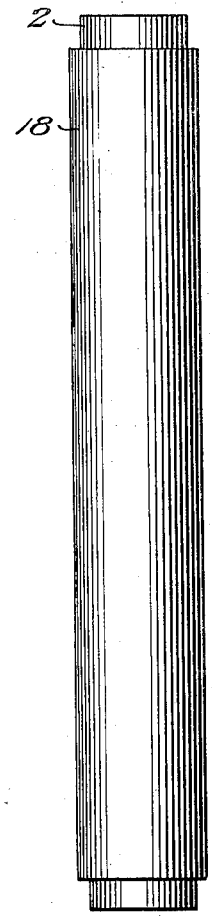
Figure 6:
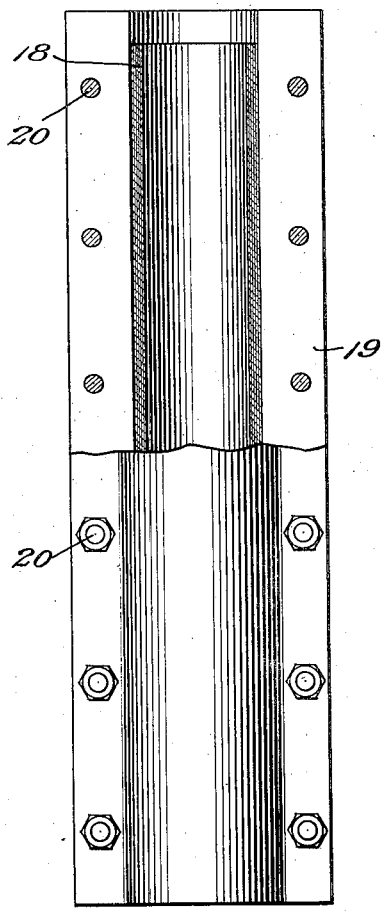
Figure 8:
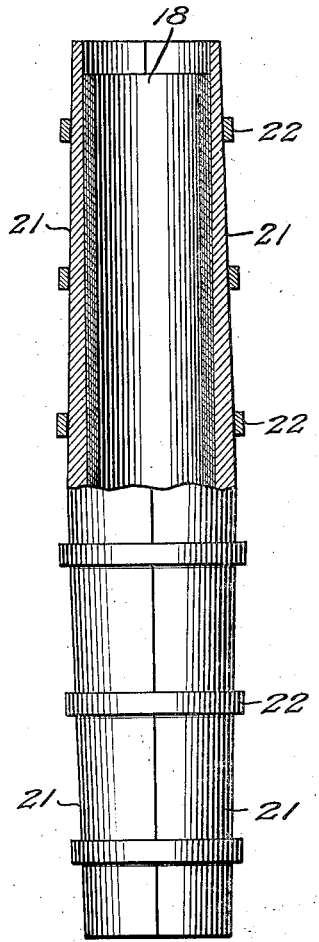

In Figs. 1 and 2:—

1, is a steam jacketed cylinder with cover; 2, are the mandrels with tubes in process; 3 is a steam jacketed reservoir for grease; 4, is a grease pump; 5, is a relief-valve to prevent pressure rising above a predetermined point; 6, is a by-pass valve; 7, is a valve controlling steam at one hundred pounds per square inch; 8, is a steam trap; 9, is a valve controlling low pressure steam or hot water; 10, is the waste pipe for condensed steam or hot water; 11, is a perforated plate on which mandrels rest, allowing better circulation of oil around and through mandrels as shown by arrows; 12, is an air relief valve; 13, is an air vent in cover of reservoir; 14, is a valve controlling cold water; 15 is a valve controlling waste of cooling water, and prevents escape of steam when valve 7 is open; 16, is a pressure gauge showing pressure of grease in cylinder 1; and 17 is a thermometer to measure temperature of grease.

In Figs. 3 to 8 inclusive:—

18, is the coated or saturated paper or fabric or plastic material to be formed into a tube; 2, is a mandrel or internal support; 19, is an external support; 20, are bolts with nuts for holding the halves of 19 together; 21, is another form of external support; and 22, are rings with various diameters which are driven over 21 to hold the halves together.

When external supports are used, the material is first wrapped on a mandrel and the external support clamped over it. The internal mandrel is then pushed out. The mandrel should be cold and well greased, but the support should be hot (300° F.). When placed in the cylinder, the grease presses against the inner surface of the material which is pressed against the support.

*Operation.*

The operation is as follows:—With valve 6 open and reservoir 3 about half full of melted grease the mandrels 2 with the material to be treated are placed in the cylinder. Enough steam is admitted to the jackets through valves 7 and 9 to keep the grease liquid. The cylinder is sealed by its cover, but air relief valve 12 left open and pump 4 started, valve 6 being closed. When all the air in the cylinder has passed out through air relief valve 12, the latter is closed and the pressure of grease in the cylinder builds up until relief valve 5 opens, thereby maintaining the pressure at the desired point. At the same time, the full pressure of steam is admitted to the cylinder jacket and the condensation is removed by steam trap 8.

When the heat and pressure have been applied for the desired time, valve 7 is closed and valve 15 is opened, releasing the steam in the jacket. Water is then admitted through cold water valve 14, passing through the jacket and out through valve 15 until the temperature, as shown by thermometer 17 is lowered to the desired point. Pump 4 is stopped and valve 6 opened, releasing the pressure in the cylinder; then valve 12 is opened, admitting air and allowing part of the grease to flow back into the reservoir 3. The mandrels and finished tubes are then removed and drained of grease.

Tubes made by this process have practically all the properties of tubes molded in regular metallic molds, but by my improved new process the tubes have no seams or mold marks and consequently are of uniform strength throughout, and also they are uniform in appearance. Tubes made by this new process save the cost of molds, and larger tubes can be made than would be practicable or possible by the molded process.

Tubes made by my process are superior to tubes baked in an oven or under air pressure, in strength, hardness, and electrical properties and they are more waterproof.

I claim:

1. An improved process of making seamless laminated tubes which consists in taking a porous fabric which has been treated with a phenolic condensation product, heating the fabric, tightly wrapping said fabric on a heated mandrel, submerging the same in a heated liquid held in a confined chamber, and applying a pressure to the liquid whereby to cause a chemical reaction in the phenolic condensation product and a resulting compression and solidification of the tubes.

2. An improved process of making seamless laminated tubes which consists in taking a porous fabric which has been treated with a phenolic condensation product, heating the fabric, tightly wrapping the fabric on a heated mandrel, submerging the same in a liquid held in a confined chamber, and applying a pressure of approximately one thousand pounds per square inch to the liquid, to cause a chemical reaction in the phenolic condensation product, and a resulting compression and solidification of the tube.

3. An improved process of making seamless laminated tubes which consists in taking a porous fabric which has been treated with a phenolic condensation product, heating the fabric, tightly wrapping the fabric on a heated mandrel, submerging the same in a liquid held in a confined chamber which has a temperature of approximately 320° F., and applying a pressure of approximately one thousand pounds per square inch to the liquid, to cause a chemical reaction in the phenolic condensation product and a resulting compression and solidification of the tube.

4. An improved process of making seamless laminated tubes which consists in taking a porous fabric which has been treated with a phenolic condensation product, heating the fabric to a temperature of 250° to 300° F., tightly wrapping the fabric on a mandrel heated to approximately 250° F., submerging the same in a liquid held in a confined chamber which has a temperature of approximately 320° F. and applying a pressure of approximately one thousand pounds per square inch to the liquid, whereby to cause a chemical re-action in the phenolic condensation product, and a resulting compression and solidification of the tube.

5. An improved process of making seamless laminated tubes which consists in taking a porous fabric which has been treated with a phenolic condensation product, heating the fabric to a temperature of 250° to 300° F., tightly wrapping the fabric on a mandrel heated to approximately 250° F., submerging the same in a liquid held in a confined chamber which has a temperature of approximately 320° F. and applying a pressure of approximately one thousand pounds per square inch to the liquid, whereby to cause a chemical reaction in the phenolic condensation product, and a resulting compression and solidification of the tube, and continuing the pressure and heat for a period of approximately fifteen minutes.

6. An improved process for making seamless laminated tubes which consists in heating to a temperature between 250° and 300° F. a sheet of fibrous material, which has been treated with a phenolic condensation product and dried, tightly wrapping said fibrous material on a metallic mandrel heated to approximately 250° F., placing the tube thus wrapped in a steam jacketed cylinder, supplying the cylinder with melted grease, applying a pressure of approximately 1,000 pounds per sq. in. through the grease to said wrappings and steam to jacket of said cylinder to heat the cylinder and its contents to approximately 320° F., and maintaining said pressure and heat for at least 15 minutes, thereby causing a chemical re-action in said phenolic condensation product and a resulting compression and solidification of the tube.

7. An improved process for making seamless laminated tubes which consists in heating to a temperature between 250° F. and 300° F. a sheet of fibrous material, which has been treated with a phenolic condensation product and dried, tightly wrapping said fibrous material on a metallic mandrel heated to approximately 250° F., placing the tube thus wrapped in a steam jacketed cylinder, supplying the cylinder with melted grease, applying a pressure of approximately 1,000 pounds per sq. in. through the grease to said wrappings and steam to jacket of said cylinder to heat the cylinder and its contents to approximately 320° F., and maintaining said pressure and heat for at least 15 minutes, thereby causing a chemical re-action in said phenolic condensation product and a resulting compression and solidification of the tube, exhausting steam from said jacket, circulating cold water through the jacket until the temperature of the cylinder and contents falls below 212° F., then releasing the pressure and removing the contents of the cylinder.

In testimony whereof I affix my signature.

WALTER C. ANDERSON.